2,992,072
PREPARATION OF DIBORANE

George F. Huff, Fox Chapel, and William H. Schechter, Zelienople, Pa., assignors to Callery Chemical Company, Pittsburgh, Pa., a corporation of Pennsylvania
No Drawing. Filed Oct. 24, 1958, Ser. No. 770,250
7 Claims. (Cl. 23—204)

This invention relates to a new and improved process for the preparation of diborane utilizing a dialkoxyborane, such as dimethoxyborane, $HB(OCH_3)_2$, as an intermediate. In particular, this process relates to a method in which an alkali metal hydride or borohydride is reacted with an excess of a trialkyl borate, a trialkoxyboroxine, or a mixture of a trialkyl borate and a trialkoxyboroxine under pressure and diborane is removed from the reaction zone. This process also contemplates the preparation of diborane by subjecting dimethoxyborane to heat and pressure.

This application is a continuation-in-part of our copending application Serial No. 510,527, filed May 23, 1955, now abandoned.

Diborane ($B_2H_6$) has become very important in recent years as an intermediate in the preparation of high energy fuels and other boron containing compounds. Diborane, in the past, has been produced principally by the reaction of an alkali metal borohydride with a boron halide. The preparation of diborane by such a process usually requires the recycle of a large portion of the boron which would otherwise be lost as a by-product of the reaction. That process for preparing diborane also suffers from the fact that the boron halides are expensive to prepare and difficult to handle.

Recently it has been proposed that diborane could be produced using dialkoxyboranes, such as dimethoxyborane $HB(OCH_3)_2$, as an intermediate which would disproportionate into diborane and the corresponding trialkyl borate. In Bush et al., Serial No. 441,636, filed July 6, 1954, for "Preparation of Dialkoxyboranes," there is described a process for preparing dialkoxyboranes by reaction of an alkali metal hydride or borohydride with an excess of a trialkyl borate. In Bush, Serial No. 498,-735, filed April 1, 1955, for "Preparation of Dialkoxyboranes," and McElroy et al., Serial No. 498,737, filed April 1, 1955, for "Preparation of Dialkoxyboranes," there are described improved processes for preparing dialkoxyboranes by the reaction of an alkali metal hydride or borohydride with a trialkoxyboroxine or a mixture of a trialkyl borate and a trialkoxyboroxine. The processes described in these copending patent applications result in the production of dialkoxyboranes, such as dimethoxyborane, in high yield and high purity.

In the prior literature (e.g. the Chemistry of the Hydrides by D. T. Hurd) dimethoxyborane (sometimes referred to as dimethoxyborine) is described as being a very unstable compound which disproportionates to diborane and methyl borate very rapidly at room temperature. The instability of dimethoxyborane is indicated as being so great that its boiling point can be determined only by extrapolation of the vapor pressure data. Recent experimental work by us, however, has shown that dialkoxyboranes, such as dimethoxyborane, are much more stable compounds than had been previously reported. For example, we have found that at 40° C. gaseous dimethoxyborane disproportionates only about 3 to 6% in 200 minutes. Similarly, at 80° C. gaseous dimethoxyborane disproportionates only about 20% in 200 minutes. The temperature for effecting the disproportionation of dimethoxyborane cannot be much above 80° C. without having considerable losses resulting from decomposition of the diborane formed to higher boron hydride. It is obvious, therefore, that a process which results in an accelerated rate of disproportionation of dimethoxyborane would be very desirable.

It is therefore one object of this invention to provide a new and improved process for preparing diborane.

A further object is to provide a new and improved process for preparing diborane in which dimethoxyborane is formed and disproportionates in situ.

Another object is to provide a new and improved process for preparing diborane by the reaction, under pressure, of alkali metal hydrides, borohydrides and alkoxyborohydrides with trialkyl borates, trialkoxyboroxines or mixtures of trialkyl borates and trialkoxyboroxines.

Still another object of the invention is to provide a new and improved process for preparing diborane in which a mixture of dimethoxyborane and trimethyl borate is subjected to heat and pressure and diborane is distilled from the mixture.

Another object of this invention is to provide a new and improved process for preparing diborane in which a mixture of dimethoxyborane and trimethyl borate are subjected to distillation at total reflux in a column of sufficient height to concentrate substantially pure dimethoxyborane at the top of the column for rapid liquid-phase disproportionation.

This invention is based upon our discovery that dialkoxyboranes, such as dimethoxyborane, disproportionate much more rapidly in the liquid phase than in the gaseous phase. This invention is further based upon our discovery that dimethoxyborane when subjected to heat and pressure disproportionates more rapidly to diborane and trimethyl borate. We have also found in this invention that when heat and pressure are applied to a reaction for preparing dialkoxyborane, such as the reaction of trialkyl borate, trialkoxyboroxine, or a mixture of trialkyl borate and trialkoxyboroxine with an alkali metal hydride or an alkali metal borohydride of the formula $MBH_n(OR)_{4-n}$, where M is an alkali metal, R is a lower alkyl radical and $n$ is an integer from 1 to 4, it is possible to recover diborane directly from the reaction rather than recovering dimethoxyborane and subsequently allowing that compound to disproportionate.

In the present invention, the reactants are used in a molar ratio that will result in the production of dialkoxyborane as disclosed in the copending applications identified above. For example when the reactants are trimethyl borate and sodium hydride, at least 2 mols of the borate per mol of hydride are used. Where the borate is reacted with an alkali metal alkoxyborohydride, the minimum number of mols of borate used depends on the number of alkoxy groups present in the borohydride; for example, with the trialkoxyborohydride a one to one ratio is used and with a dialkoxyborohydride at least two mols of the borate are used per mol of the borohydride. When trimethoxyboroxine is reacted with sodium hydride, a molar ratio of at least 10 to 6 is used. Other reaction ratios are disclosed in the cited copending applications to which reference may be made for those details.

The invention will be described further in conjunction with the following examples. It is to be understood that the details disclosed are given by way of illustration and are not to be construed as limiting the invention.

In one experiment sodium hydride and trimethyl borate were charged into a round-bottomed flask. At the top of the flask there was provided a distillation column packed with Raschig rings. The column was maintained under about 2 atmospheres pressure and heated at total reflux for several hours. At the end of this period time the reaction mixture was further heated while withdrawing reaction products from the top of the column. The gases removed from the top of the column consisted of diborane of high purity containing small amounts of dimethoxyborane and trimethyl borate vapor.

In another experiment, 24 grams of sodium hydride and 300 ml. of trimethoxyboroxine are heated in a still pot provided with a column attached thereto. The still pot is heated while its contents are stirred. By operating the column at total reflux for all components other than diborane, liquid dimethoxyborane concentrates at the top of the column where it is disproportionated to trimethyl borate and product diborane.

In various qualitative tests on the foregoing reaction, the column was operated at different reflux ratios to determine when a high concentration of dimethoxyborane was being obtained at the top of the column. It was found that a high concentration (e.g. above 15%) occurred when the heat temperature was in the range of 60 to 65° C. and the reflux ratio was about 20 to 1. Hence, upon operating at that temperature and total reflux, a very high rate of production of diborane will be achieved.

Since the borohydrides also can be reacted with the trialkoxyboroxines to obtain the corresponding dialkoxyborane, it is evident that upon ocnducting that reaction in a vertical reaction zone and at total reflux of everything other than diborane, the latter can be readily produced.

In another experiment sodium trimethoxoborohydride and a stoichiometric excess of trimethyl borate were charged into the pot of a distillation column. A packed distillation column was used having a high reflux ratio and the distillation was carried out under about 4 atmospheres' pressure. A substantial amount of diborane was removed with the overhead product from the column.

In another experiment a small amount of sodium borohydride was mixed with a stoichiometric excess of trimethoxyboroxine and trimethyl borate. The mixture was stirred and heated at total reflux. The pressure in the column was allowed to increase to about 4 atmospheres at which time the overhead product was removed. The overhead product from the reaction was found to consist largely of diborane together with a small amount of dimethoxyborane and trimethyl borate.

In other experiments it was found that sodium hydride or sodium trimethoxyborohydride or sodium borohydride will react with trimethyl borate and trimethoxyboroxine dissolved in or in suspension in an ethylene glycol dialkyl ether of the formula $R(OC_2H_4)_nOR$ where R is a lower alkyl radical and $n$ is an integer from 1 to 4, such as diethylene glycol dimethyl ether, to give high yields of diborane when distilled in a distillation column under several atmospheres' pressure.

In other experiments the disproportionation of dimethoxyborane was studied to determine the effect of temperature and pressure on the disproportionation reaction. The dimethoxyborane was generally prepared by the reaction of a solution of sodium borohydride in diethylene glycol dimethyl ether with trimethyl borate and trimethoxyboroxine. This reaction mixture was distilled at a moderately high reflux ratio and substantially quantitative yields of dimethoxyborane of a very high purity were obtained. In this series of experiments the dimethoxyborane was maintained at a substantially constant initial pressure and a substantially constant temperature in a closed system. At the end of various periods of time the contents of the closed system were analyzed for the amount of diborane formed and the amount of dimethoxyborane which had not disproportionated. In one series of experiments a mixture of dimethoxyborane and trimethyl borate was heated at atmospheric pressure. The partial pressure of dimethoxyborane in the gaseous mixture was about 340 mm. At the end of 200 minutes the extent of disproportionation of the dimethoxyborane varied from 3 to 6% at 40° C. depending upon the type of reactor used. The higher rates of disproportionation were obtained where the reactor was filled with broken glass packing to provide a greater reaction surface. When the temperature of the reaction was increased to 80° C. the extent of disproportionation after 200 minutes was about 22%. In still another experiment dimethoxyborane at a partial pressure of about 300 mm. was heated to 200° C. At this temperature data are very difficult to obtain because of the rapid decomposition of the diborane which is formed. However the extent of disproportionation after 5 minutes was found to be about 14% at this temperature.

In another series of experiments a mixture of dimethoxyborane and trimethyl borate was heated under a pressure of about 4 atmospheres. In these experiments the dimethoxyborane-trimethyl borate mixture was heated at total reflux (about 80° C.). In these experiments the rate of disproportionation was found to increase with increase in pressure and was found to be greatest when the pressure is sufficient to maintain most of the dimethoxyborane in the liquid phase. When a mixture of dimethoxyborane and trimethyl borate was heated at total reflux at about 4 atmospheres' pressure for a period of 70 minutes the amount of disproportionation was found to be about 70%. From these experiments it was established that the rate of disproportionation of dimethoxyborane in the liquid phase is greater by approximately a full order of magnitude than the rate of disproportionation in the gas phase at the same temperature.

Other experiments were carried out in which liquid dimethoxyborane was disproportionated in a sealed glass bulb at different temperatures. The results which were obtained were plotted on a graph as the reciprocal of the percent dimethoxyborane undisproportionated versus the time in minutes. These data produced a straight line graph thus indicating that the disproportionation reaction is of the second order in the measured time range. The rate constant was calculated to be $6.76 \times 10^{-5}$ % undisproportionated$^{-1}$ minutes$^{-1}$ at 32° C. Rate constants were also calculated for 50° C., 70° C. and 100° C. to be $2.53 \times 10^{-4}$, $1.20 \times 10^{-3}$, and $7.16 \times 10^{-3}$ respectively, based on the experimental data obtained. Other experiments were carried out in a stainless steel reactor and produced rate curves having slightly different slopes. When the experiments were carried out in highly polished stainless steel reactors the results obtained approximated those obtained in glass apparatus. These experiments indicate that the reaction is surface activated.

In still other experiments it was found that when a mixture of dimethoxyborane and trimethyl borate is distilled at total reflux in a column of sufficient length and sufficient number of plates to condense substantially pure dimethoxyborane at the top of the column, disproportionation takes place continuously at a very rapid rate and diborane can be removed continuously from the top of the column. The trimethyl borate, which is a by-product of the disproportionation, returns to the bottom of the column and is removed. The disproportionation reaction can be carried out most effectively when the mixture of dimethoxyborane and trimethyl borate is introduced into the central portion of the column so that pure trimethyl borate is removed at the bottom of the column and diborane at the top. When the reaction is carried out in a column in the manner described, the process can be operated at atmospheric pressure so long as a sufficiently high concentration of liquid dimethoxyborane is maintained at the top plate of the column. At superatmospheric pressures the dimethoxyborane condensing at the top of the column can be maintained at a much higher temperature and the disproportionation takes place more rapidly.

From the foregoing experiments it was found that diborane may be produced directly by the reaction of alkali metal hydrides or borohydrides with trialkyl borates, trialkoxyboroxines, and mixtures of trialkyl borates with trialkoxyboroxines in proportions which would otherwise produce dimethoxyborane, provided that the distillation of the reaction mixture is carried out under a moderately high pressure or at total reflux in a column of sufficient height to concentrate substantially pure liquid dimethoxyborane at the top of the column. Similarly it is possible by this process to produce diborane by heating a mixture of an alkali metal hydride or borohydride with a trialkyl borate or a trialkoxyboroxine or a mixture of a trialkyl borate and a trialkoxyboroxine and distilling therefrom a mixture of a trialkyl borate and dialkoxyborane. The dialkoxyborane is thereupon disproportionated by heating at total reflux under an elevated pressure or at total reflux in a column of sufficient height to concentrate substantially pure liquid dimethoxyborane at the top of the column. Experiments which were carried out varying the pressure of this process show that the process is operative over a wide range of pressures when carried out at or below the reflux temperature for the given pressure.

While we have described our process as required by law and have illustrated several preferred embodiments of this process, it is to be understood that, within the scope of the appended claims, this invention may be practiced otherwise than as specifically described.

We claim:

1. A method of preparing diborane which comprises reacting at least one compound selected from the group consisting of tri-loweralkyl borates, $B(OR)_3$, and tri-loweralkoxy boroxines, $B_3O_3(OR)_3$, where R is a lower alkyl radical, with at least one hydride compound selected from the group consisting of MH and $MBH_n(OR)_{4-n}$, where M is an alkali metal, R is a lower alkyl radical and $n$ is an integer from 1 to 4, in a vertical reaction zone, using a molecular proportion of said reactants whereby a reaction mixture containing $HB(OR)_2$, where R is a lower alkyl radical, is produced, subjecting said mixture to a superatmospheric pressure and total reflux for all components present other than diborane, and continuously removing the diborane thus formed from the top of said reaction zone.

2. A method according to claim 1 in which M is sodium and R is $CH_3$.

3. A method according to claim 2 in which the hydride compound is $NaBH_4$ and is added in solution in an ethylene glycol dialkyl ether having the general formula $R(OC_2H_4)_nOR$ where R is a lower alkyl radical and $n$ is an integer from 1 to 4.

4. A method of preparing diborane which comprises introducing a mixture of dimethoxyborane and trimethyl borate into a distillation column at a pressure substantially above atmospheric pressure, and subjecting said mixture to distillation at total reflux for all components present other than diborane whereby trimethyl borate is recovered at the bottom of the column and diborane at the top of the column, and recovering the diborane formed.

5. A method preparing diborane which comprises subjecting a mixture of dimethoxyborane and trimethyl borate to distillation at total reflux in a column of sufficient length and sufficient number of plates to concentrate substantially pure liquid dimethoxyborane at the top of the column, and recovering diborane from the top of the column.

6. A method according to claim 5 in which the mixture of dimethoxyborane and trimethyl borate is introduced into the central portion of the column and diborane and trimethyl borate are removed continuously from the top and bottom of the column respectively.

7. A method according to claim 6 in which the distillation is carried out at an elevated temperature and superatmospheric pressure.

References Cited in the file of this patent

UNITED STATES PATENTS 2,494,968     Schlesinger et al.     Jan. 17, 1950

OTHER REFERENCES

Hurd: "Chemistry of the Hydrides," page 91, John Wiley & sons, 1952. Copy in Sci. Library, QD181 H1H7.

Brown et al.: "J.A.C.S.," vol. 75, pages 192–195 (1953). Copy in Scientific Library.

Schlesinger et al.: II, "J.A.C.S.," vol. 75, pages 205–209 (1953). Copy in Scientific Library.